April 18, 1967  J. B. RUSSELL ET AL  3,314,375
STEERING GUIDE FOR SLOT CARS
Filed Jan. 5, 1965  2 Sheets-Sheet 1
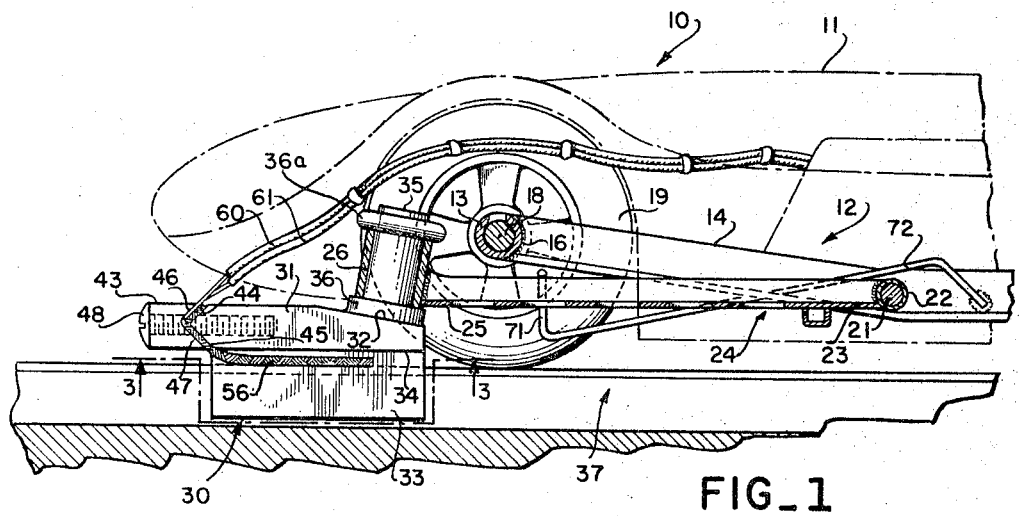
FIG_1
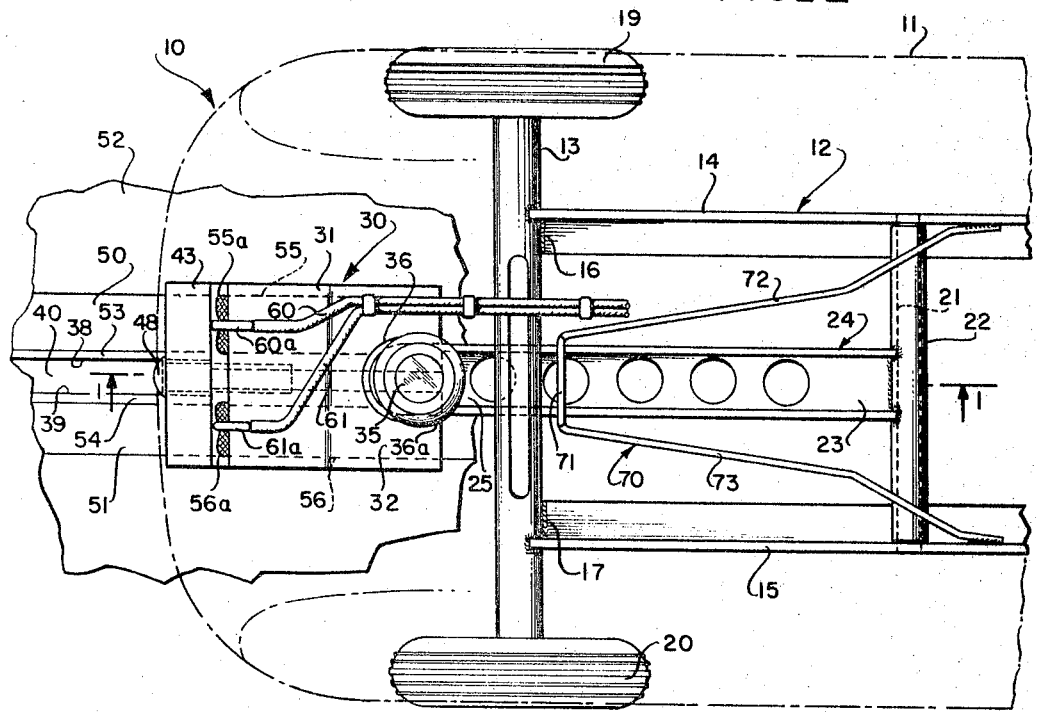
FIG_2
INVENTORS
JAMES B. RUSSELL
HENRY S. ROSE
By R.E. Geangue
Attorney

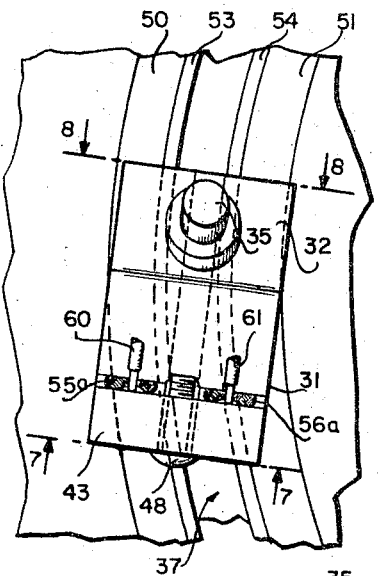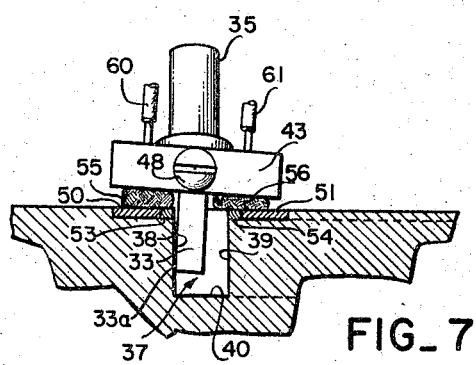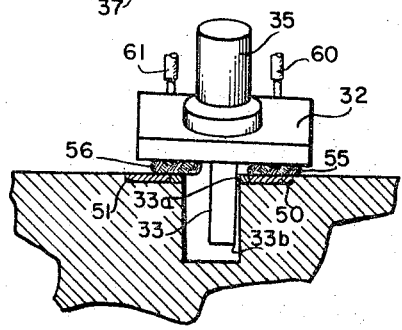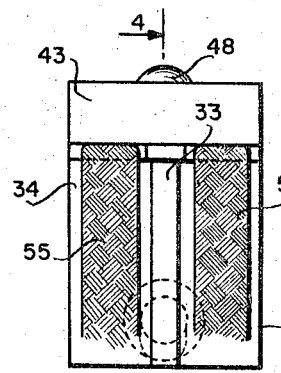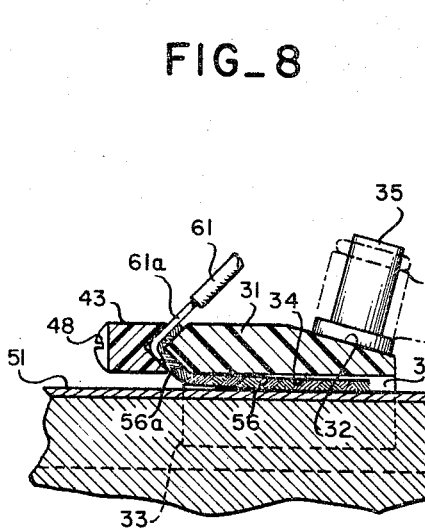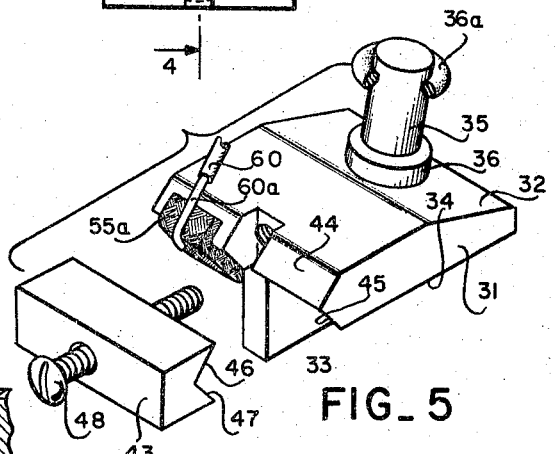

United States Patent Office 3,314,375
Patented Apr. 18, 1967

3,314,375
STEERING GUIDE FOR SLOT CARS
James B. Russell, Sepulveda, and Henry S. Rose, Los Angeles, Calif., assignors to American Russkit Company, Los Angeles, Calif., a corporation of California
Filed Jan. 5, 1965, Ser. No. 423,545
10 Claims. (Cl. 104—60)

This invention relates to a steering guide for slot cars and more particularly to a steering guide which is used for directional control and electrical contact pickup on miniature models of racing and other types of automotive vehicles.

Steering guides presently in use are mounted for rotation about a vertical axis so that the guide can rotate and hold the car on the track as the car goes around a curve. However, the guide does not aid the car in staying on the track since it remains straight up and down in the track and simply becomes twisted in the track during the turn. The steering guide of the present invention has an axis which is tipped rearwardly somewhat so that when the guide twists during a turn, the body becomes tilted and a corner of the blade in the slots grips a side of the slot and thereby provides a holding force tending to retain the car on the track during fast turns.

In present slot cars, the steering guide carries the brushes which bear against contact strips on either side of the slot and electrical leads connect the brushes with the motor for the car. These leads are usually soldered to the brushes and are subject to continual breaking since the cars do go off the track resulting in considerable impact force on the steering guide to which the electrical leads are connected. By the present invention, the steering guide is equipped with a brush retainer to facilitate the connection of the lead wires to the brushes without the necessity of soldering or other time consuming types of connection. The brush retainer comprises a retainer cap which is removably attached to the front end of the steering guide and the ends of the two brushes are clamped between the cap and the main body when the brush retainer is assembled. The ends of the leads are simply placed over the clamped ends of the brushes before assembly so the leads are maintained in electrical contact with the brushes. The brushes can take any form, such as a braided loom shielding wire or a flat plate type of pickup contact. Since the brush retainer requires no contact posts or upstanding weldments on the body of the steering guide, the lowest possible silhouette for the guide and slot car can be employed.

It is therefore an object of the present invention to provide a steering guide for a slot car which is mounted about an axis slanted rearwardly so that the steering body becomes tilted as it rotates during a turn, thus causing one portion of the blade to dig into a side of the slot to aid in holding the car on the track.

Another object of the present invention is to provide a steering guide for a slot car which has a brush retainer comprising a cap for clamping the brushes and the leads together without the necessity of welding or other special types of lead attachments.

Another object of the present invention is to provide a steering guide for a slot car in which the guide is located forward of the wheels and has no upstanding terminals thereon so that the car and guide can have the lowest possible silhouette.

These and other objects of the invention not specifically set forth above will become readily apparent from the accompanying description and drawings in which:

FIGURE 1 is a vertical section along line 1—1 of FIGURE 2 showing the front suspension of a slot car equipped with the steering guide of the present invention;

FIGURE 2 is a top plan view along 2—2 of FIGURE 1 illustrating the steering guide located on the track;

FIGURE 3 is a bottom plan view along line 3—3 of FIGURE 1 showing the wire braid brushes and the blade located in the slot;

FIGURE 4 is a vertical section along line 4—4 of FIGURE 3 showing the blade in a straight portion of the slot;

FIGURE 5 is an expanded perspective view of the steering guide with the retainer cap disconnected for assembly of the brushes and leads;

FIGURE 6 is a top plan view of the steering guide while executing a turn;

FIGURE 7 is a front elevational view of the steering guide along line 7—7 of FIGURE 6 showing the manner in which the front corner of the blade digs into the side of the track slot; and FIGURE 8 is a rear elevational view along line 8—8 of FIGURE 6 showing the position of the back end of the blade during the turn.

Referring to the embodiment of the invention chosen for purposes of illustration, the slot car 10 comprises a body 11 shown in phantom lines which can be of any desired shape. The body frame 12 extends between a front housing 13 and the rear end of the vehicle (not shown) where the motor drive and rear wheel are located. The frame 12 consists of longitudinal L shaped members 14 and 15, the ends of which are welded to the housing 13 at locations 16 and 17, respectively. Axle 18 for front wheels 19 and 20 is rotatably mounted with the housing 13. A pin 21 is connected at its ends to members 14 and 15 and rotatably supports a housing 22 to which one end 23 of a channel shaped tongue 24 is attached. As illustrated in FIGURE 1, the frame members 14 and 15 are slanted upwardly from the pin 21 so that the car body has a low profile. The other end 25 of the tongue is welded to a cylinder or collar 26 having an axis slanting upwardly and rearwardly at about ten degrees to the horizontal.

The steering guide 30 comprises a top panel 31 having a slanting surface 32 at the back end and a blade 33 extends downwardly from the middle of the lower surface 34 of the panel. A pin 35 is attached to the slant surface 32 and extends upwardly through the collar 26. The end of the collar rests on enlarged base 36 of the pin and a rubber retainer ring 36a is stretched around the upper end of the pin and located at the top end of the collar to retain the pin in the collar while permitting the guide 30 to rotate about the axis of the pin 35. The bottom surface 34 of the guide 30 is horizontal when the car is traveling in a straight path and the blade 33 projects perpendicular to the bottom surface into slot 37 formed in the track surface by sides 38 and 39 and bottom 40. The front end of panel 31 contains a V-shaped cut which severs retainer cap 43 from the rest of the panel. The cut provides angular surfaces 44 and 45 on panel 31 and opposite angular surfaces 46 and 47 on the cap 43. A screw 48 serves to hold the retainer cap 43 on the end of the top panel 31.

Flat metallic conductor bars 50 and 51 are embedded in the track surface 52 on the opposite sides of the slot 37 and are spaced from the slot by strips 53 and 54, respectively. A pair of brushes 55 and 56 in the form of strips of wire braid are located on opposite sides of blade 33 and lie along the bottom surface 34 of the panel 31 in order to make electrical contact with the tracks 50 and 51, respectively. The ends 55a and 56a of brushes 55 and 56, respectively, are held between the angular surfaces on panel 31 and cap 43 while the other ends of the brushes are free to move against the contact bars. A pair of leads 60 and 61 have bare ends 60a and 61a which are placed over the ends 55a and 56a, respectively, of the braid prior to the time that the screw 48 is tightened down to force the angular surface of cap 43 toward the angular surfaces of panel 31 to thereby clamp the leads against the wire braid and firmly secure the ends of the wire braid to the panel 31. Thus, the leads 60 and 61 are in electrical contact with the conducting plates 50 and 51 through the brushes 55 and 56 and supply electrical energy to the motor for driving the car. A wire spring 70 has a U-shaped end 71 which continually bears against the tongue 24 and legs 72 and 73 of the spring are welded to the members 14 and 15, respectively. The spring 70 continually biases the tongue 18 downwardly in order to hold the braid brushes 55 and 56 against the contacting plates and maintain a good circuit connection to the lead 60 and 61. However, the steering guide can move about pin 21 when uneven track surface is encountered. When the car is following a straight portion of the slot 37, the steering guide remains horizontal and in straight alignment along the longitudinal axis of the car. However, when the car enters a curved portion of slot 37, the steering guide 26 rotates about pin 35 and becomes slightly cocked as illustrated in FIGURES 7 and 8 because of the angle of the pin 35 to the vertical. This cocking forces the front, bottom corner portion 33a of blade 33 against the side 38 of the track and this force resists outward movement of the blade 33 from the slot. As illustrated in FIGURE 8, the cocking also moves the back bottom corner 33b somewhat away from the side 39 but blade contact remains at the upper back corner portion 33c of the blade. Because of the force exerted at the corner 33a as the car manipulates a turn, the car can take sharp curves at a faster speed than cars of prior construction thereby giving the racer a competitive advantage. In the event the blade does come out of the slot and an impact on the steering guide breaks the leads, the screw 48 can be quickly loosened and additional bare lead wire placed between the brush and angular surfaces. The screw is then retightened and the car is ready to go again. Thus, a competitive advantage is obtained because the car can be put back into service during the race in much quicker time than required if the leads had to be soldered to the brushes. The use of the brush retainer also permits the brushes to be quickly replaced with new brushes.

The pin 35 can be rotatably affixed to the chassis in various manners and while the rearward deflection of the pin is preferably about ten degrees, other amounts of rearward tilting from smaller to much larger angles have been found successful in providing a holding force on the blade during turning. The angular holding surfaces of the retainer cap and the top panel of the guide can be replaced with arched, serrated, or other broken surfaced matching faces which will hold the brush material and lead wires firmly in place. Since the only structure projecting upwardly from the steering guide is the pin 35, the silhouette of a car can be low over the guide to provide a stream line appearance and small clearance above the track for stability. Also, the guide can be mounted at the most convenient location beneath the car. The overall dimensions of the guide 30 and the exact placement of the blade 33, and the pin 36, and the cap 43 in relation to each other and to the body of the guide itself can be modified for application to a particular vehicle. Various other modifications are contemplated by those skilled in the art without departing from the spirit and scope of the invention as hereinafter defined by the appended claims.

What is claimed is:
1. A steering guide for a slot car running on a track containing a slot comprising:
   a panel located at the front end of said car and extending over the slot in the track;
   a blade attached to the lower surface of said panel and projecting into said slot;
   a pin projecting from the back portion of the top surface of said panel upwardly and rearwardly at an angle to said lower surface of said panel; and
   means connected with said car for rotatably housing said pin to permit said panel and blade to rotate and cock slightly when the blade enters a curve in said slot, the cocking of said blade causing a portion of said blade to be forced against a side of said track to aid in holding said blade in said track.

2. A steering guide as defined in claim 1 having a removable retainer cap secured to the forward end of said panel and having a clamping surface shaped to match an adjacent clamping surface on said panel;
   a pair of brushes extending along the lower surface of said panel on opposite sides of said blade; and
   each of said brushes having an end secured between said clamping surfaces.

3. A steering guide as defined in claim 2 having a lead wire overlapping the end of each brush located between said clamping surfaces in order to connect said leads to said brushes by said retainer cap.

4. A steering guide as defined in claim 1 wherein said pin housing means comprises:
   a cylinder for receiving said pin;
   arm means having one end fixed to said cylinder; and
   means for pivotally attaching the other end of said arm means to said car at a location rearwardly of said panel to permit up and down movement of said panel and blade.

5. A steering guide for slot cars running on a track containing a slot and having conductors on opposite sides of the slot embedded in the surface of the track comprising:
   a panel supported at the front end of said car and extending over the slot in the track;
   a blade attached to the lower surface of said panel and projecting into said slot;
   brush retaining means comprising a removable retainer cap secured to the forward end of said panel; and
   said panel and cap having confronting brush clamping surfaces at opposite sides, respectively, of the plane of said blade.

6. A steering guide as defined in claim 5 having a pair of brushes extending along the lower surface of said panel on opposite sides of said blade, each of said brushes having an end secured between the adjacent confronting brush clamping surfaces and a portion in contact with one of said conductors.

7. A steering guide as defined in claim 5 having a lead wire overlapping the end of each brush secured between the adjacent confronting brush clamping surfaces in order to connect said leads to said brushes.

8. A steering guide as defined in claim 5 having means projecting upwardly from the upper surface of said panel for rotatably supporting said panel.

9. A steering guide as defined in claim 5 wherein said confronting brush clamping surfaces on said retainer cap and said panel are V-shaped.

10. A steering guide as defined in claim 9 wherein said brush retaining means further comprise bolt means for tightening said retainer cap on said panel after said brush ends and wire leads are placed between said clamping surfaces.

References Cited by the Examiner
UNITED STATES PATENTS

| | | | |
|---|---|---|---|
| 3,159,109 | 12/1964 | Braverman | 104—148 |
| 3,195,472 | 7/1965 | Rannalli | 104—60 |
| 3,202,109 | 8/1965 | Stewart | 104—60 |

ARTHUR L. LA POINT, *Primary Examiner.*

DRAYTON E. HOFFMAN, *Examiner.*